United States Patent [19]
Shinozaki et al.
[11] 3,877,938
[45] Apr. 15, 1975

[54] ETCH-BLEACHING METHOD

[75] Inventors: Fumiaki Shinozaki; Masayoshi Tsuboi; Tomoaki Ikeda, all of Saitama, Japan

[73] Assignee: Fuji Photo Film Co., Ltd., Kanagawa, Japan

[22] Filed: Jan. 26, 1973

[21] Appl. No.: 326,721

[30] Foreign Application Priority Data
Jan. 28, 1972 Japan .............................. 47-10671

[52] U.S. Cl. ...................... 96/29 L; 96/33; 96/60 R
[51] Int. Cl. ....... G03c 5/54; G03c 7/02; G03c 5/32
[58] Field of Search ......................... 96/33, 29 L, 60

[56] References Cited

UNITED STATES PATENTS 2,013,116 9/1935 Troland ................................ 96/33
2,494,053 1/1950 Mitson et al. .......................... 96/33
3,313,233 4/1967 Uhlig et al. ............................ 96/33

*Primary Examiner*—Mary F. Kelley
*Attorney, Agent, or Firm*—Sughrue, Rothwell, Mion, Zinn & Macpeak

[57] ABSTRACT

In an etch-bleaching method which comprises processing a hydrophilic cellulose layer wherein a silver image is present with an etch-bleaching solution, the improvement which is then processing with an aqueous solution of a water-soluble organic compound having a physical adsorptive property to the hydrophilic cellulose and having at least one anionic substituent.

9 Claims, No Drawings

ETCH-BLEACHING METHOD

BACKGROUND OF THE INVENTION

1. Field of the Invention

This invention relates to an etch-bleaching method employed in preparing a planographic printing plate, or like materials.

2. Description of the Prior Art

The term "etch-bleaching method" as used in the present specification means a method for removing the hydrophilic areas in the vicinity of a silver image utilizing the silver image present in the hydrophilic portion, and the term etch-bleaching solution means a processing solution which makes the hydrophilic area in the vicinity of the silver image weak and friable so as to permit removal as described above.

In general, a planographic printing plate comprises an image area-forming area and a non-image area-forming hydrophilic area. Processes are known for preparing such printing plates by selectively rendering the hydrophilic surface of the support at the image area oleophilic, the process comprising providing a hydrophilic layer on the oleophilic surface and removing the hydrophilic layer at the image area to lay bare the oleophilic layer.

For example, in British Patent No. 1,129,366, there is described the process of preparing a printing plate by forming a silver image in a hydrophilic layer containing a nuclei substance for the deposition of silver in the diffusion transfer method, the hydrophilic layer being provided on a support which has thereon an oleophilic layer. The hydrophilic layer corresponding to the silver image is removed utilizing the silver image to thereby lay bare the oleophilic support.

In U.S. Pat. NO. 3,385,701, there is described a process of preparing a printing plate which comprises bringing an exposed negative material into contact with a hydrophilic layer containing a nuclei substance for diffusion transfer which is provided on a support having an oleophilic surface, conducting diffusion transfer development to form a silver image in the hydrophilic layer and removing the hydrophilic layer corresponding to the silver image utilizing the silver image to thereby lay bare the oleophilic support.

In German Patent OLS 2,048,594, there is described a process for preparing a photographic planographic printing plate wherein a light-sensitive silver halide photographic emulsion layer provided on the hydrophilic surface of cellulose organic acid ester sheet having a hydrophilic surface containing a nuclei substance for diffusion transfer is imagewise exposed to an original to form a silver image reversed to the original in the hydrophilic surface according to a diffusion transfer method, the element is treated with an aqueous solution containing hydrogen peroxide and then the hydrophilic surface portion at which silver image is present is removed to lay bare the oleophilic surface of the cellulose organic acid ester sheet.

In any of the above-described processes, etch-bleaching is the method of removing the area where silver image was formed. However, in these conventional etch-bleaching methods since only processing with an etch-bleaching solution is conducted, the removal of the hydrophilic area where the silver image is present requires strong rubbing or swabbing with a sponge, an absorbent cotton, etc. The requirement for strong rubbing renders the process difficult to work, and, in addition, it sometimes causes scratches in other portions, a serious defect. In addition, in some cases the hydrophilic area where the silver image is present is not completely removed. Therefore, in the case of using such printing plate, distinct prints are difficult to obtain.

SUMMARY OF THE INVENTION

As a result of various experiments and studies on means of overcoming the above-described defects, the inventors reached the present invention. More particularly, the present invention is an etch-bleaching method which comprises processing a hydrophilic cellulose layer in which a silver image is present with an etch-bleaching solution, then processing it with an aqueous solution of a water-soluble organic compound having the property of being physical adsorbed on the hydrophilic cellulose layer and having at least one or more anionic substituents.

DETAILED DESCRIPTION OF THE INVENTION

As the hydrophilic cellulose layer (in the present specification, the term "cellulose" includes cellulose derivatives) wherein a silver image is present, there are for example, those prepared by forming the silver image utilizing light-sensitive film as described in French Patent No. 1,531,995. In this French Patent there is described a light-sensitive film prepared by saponifying at least one side of a cellulose acetate sheet with an alkali and, after processing with a weakly acidic solution, wetting the surface with a solution of a water-soluble halide, drying within 30 minutes, and then wetting with an aqueous solution of a water-soluble silver salt to thereby form a light-sensitive silver halide in the saponified surface.

The hydrophilic cellulose layer in the present invention wherein a silver image is present can also be obtained by forming the silver image according to the diffusion transfer method in an image-receiving material for use in silver halide diffusion transfer. In this case, the hydrophilic cellulose layer contains a nuclei substance for diffusion transfer and is provided on a support.

In general, the above-described image-receiving material for use in a silver salt diffusion transfer process is prepared by dispersing a nuclei material in an aqueous solution of a hydrophilic cellulose material (e.g., carboxymethyl cellulose, hydroxyethyl cellulose, sodium alginate, etc.), and applying the resulting dispersion onto a suitable support (e.g., a cellulose organic acid ester, an inorganic acid ester, a polyvinyl ester, etc.).

Further, image-receiving materials as described in British Patent No. 1,149,921 which are prepared by incorporating a nuclei substance for diffusion transfer into a cellulose ester by vacuum deposition, subjecting the product to solution film formation, and then rendering it hydrophilic by chemical processing, or image-receiving materials prepared by selectively rendering the surface of a cellulose ester sheet hydrophilic and introducing a nuclei substance for diffusion transfer into the hydrophilic portion can also be used.

The above image-receiving material for use in a silver salt diffusion transfer process whose surface is selectively made hydrophilic and a nuclei substance for diffusion transfer is incorporated therein can be prepared, for example, as follows. The surface of the hydrophobic cellulose ester layer such as a cellulose organic acid ester (e.g., cellulose diacetate, cellulose triacetate or a mixture thereof, cellulose acetate, cellulose propionate, cellulose butyrate, cellulose acetate butyrate, etc.), a cellulose inorganic acid ester (e.g., cellulose nitrate, etc.), or the like, is rendered hydrophilic by any already known procedure, for example, the surface can be rendered hydrophobic by hydrolyzing with alkali.

The introduction of the nuclei substance for diffusion transfer into the hydrophilic portion thus obtained can be achieved by immersing it in a processing solution containing the nuclei substance or by applying the processing solution thereto. It is also possible to render the surface hydrophilic and at the same time introduce the nuclei substance for diffusion transfer therein by incorporating the nuclei substance in the processing solution used to render the surface of the hydrophobic cellulose ester material hydrophilic.

In the image-receiving material thus obtained a silver image is formed according to the diffusion transfer method, which silver image-bearing material is used in the present invention. However, any material can be used in the present invention so long as the resulting image is a silver image and the silver image is formed in/on a hydrophilic cellulose layer. The elements thus processed in accordance with the present invention are per se known in the prior art, and any element which meets the general requirements recited above can be used with success in the present invention.

In some cases a tendency may be noted for a higher concentration of the nuclei substance to occur in the surface of an image receiving layer as described above, so an unduly thick layer should not be used. This phenomena is well known in the art and is considered primarily from the viewpoint of ease of layer removal.

The etch-bleaching solution used in the present invention generally comprises an aqueous solution containing an oxidizing agent and, if desired, at least one cupric salt or ferric salt, an acid or a compound capable of reacting with silver ions to form a complex having low solubility in water.

As the oxidizing agent, there can be used, for example, any water soluble peroxide-type compound, e.g., hydrogen peroxide, persulfate (e.g., peroxosulfate, peroxodisulfodisulfate, etc.), perborate, periodate, percarbonate, pernitric salts, periodate salts and the like. Hydrogen peroxide and peroxodisulfate are especially preferred.

These oxidizing agents are effectively incorporated in the etch-bleaching solution in an amount of from 0.3 to 30 percent by weight of the solution.

As the cupric salts or ferric salts, those which form cupric ions or ferric ions in an aqueous solution wherein the corresponding anion released has no harmful influence on the other components in the etch-bleacing solution or on the hydrophilic portion other than the area of silver image can satisfactorily be used. Preferred specific examples thereof include cupric halides (e.g., cupric chloride, cupric bromide, etc.), cupric sulfate, cupric nitrate, cupric citrate, potassium ferricyanate, and the like.

As the acids, organic acids such as acetic acid, citric acid, tartaric acid, phthalic acid, maleic acid, benzenesulfonic acid, etc., or inorganic acids such as hydrochloric acid, nitric acid, sulfuric acid, phosphoric acid, etc. can be used. The acids stabilize the etch bleaching bath where a peroxide-type oxidizing agent is used since such agents tend to be somewhat unstable in basic medium.

Compounds capable of reacting with silver ions to form a complex having low solubility in water function to control the increase in the silver ion concentration in the etch-bleaching solution and to allow the reaction to proceed smoothly. Specific examples thereof include, halides, tartarates, carbonates, chromates, formates, etc., and, in particular, the halides are preferred. Compounds which form precipitates upon reacting with $Ag^+$, $Cu^+$ or $Fe^{2+}$ but no precipitates upon reacting with $Cu^{2+}$ or $Fe^{3+}$are preferred.

The effective amount of each of the above-described additives other than the oxidizing agent ranges from 0.05 to 50 percent by weight of the etch-bleaching solution.

Some specific formulations of etch-bleaching solutions as can be used in the present invention are illustrated hereinafter. In all cases, solution A and solution B are mixed upon use.

| | | | |
|---|---|---|---|
| i) | A: | Cupric chloride (dihydrate) | 10 g |
| | | Citric acid | 10 g |
| | | Water to make | 1 liter |
| | B: | Ammonium peroxodisulfate | 120 g |
| | | Water to make | 1 liter |
| ii) | A: | Cupric chloride (dihydrate) | 10 g |
| | | Citric acid | 10 g |
| | | Water to make | 1 liter |
| | B: | Potassium peroxodisulfate | 120 g |
| | | Water to make | 1 liter |
| iii) | A: | Cupric sulfate (5 hydrate) | 120 g |
| | | Citric acid | 170 g |
| | | Potassium bromide | 10 g |
| | | Water to make | 1 liter |
| | B: | Ammonium peroxodisulfate | 120 g |
| | | Water to make | 1 liter |
| iv) | A: | Cupric chloride | 15 g |
| | | Glacial acetic acid | 50 ml |
| | | Water to make | 1 liter |
| | B: | Hydrogen peroxide aqueous solution (35% by weight) | 100 ml |
| v) | A: | Cupric chloride | 10 g |
| | | Citric acid | 10 g |
| | | Water to make | 1 liter |
| | B: | Hydrogen peroxide aqueous solution (35% by weight) | 100 ml |

As water-soluble organic compounds having a physical adsorptive property to the hydrophilic cellulose used in the invention and having at least one or more of anionic substituents, there are illustrated, for example, direct cotton dyes, basic dyes, naphthol dyes (i.e., coupling components of azoic colors), and acidic dyes, described in Dye Handbook (published by Maruzen Kabushiki Kaisha, Japan, in 1970), at page 83 and at pages 245–246. The term "anionic substituent" as used herein means a sulfo group, sulfino group $COO^-$ group, $—CS_2^-$ group, carboxyl group or like acid and/or salts thereof.

The term "direct cotton dyes" as used herein refers to water-soluble anionic dyes which are capable of directly dyeing cellulose fibers. These dyes can roughly be classified into azo-types, stilbene-types, thiazol-types, dioxazine-types and phthalocyanine-types in view of their chemical structure, but most of the direct cotton dyes fall within the class of the azo-type dyes, in particular, diazo and triazo dyes and copper-complex ago dyes. The dyeability of the direct cotton dyes for cellulose fibers is due to the physical absorption between the dyes and the fibers.

The term "basic dyes" as used herein refers to water-soluble dyes in the form of an amine salt or ammonium salt (sometimes encountered in form of a zinc chloride complex). These basic dyes have a wide variety of chemical structure and include azo, triphenylmethane, azine, oxazine and thiazine dyes, all of which are well known in the art.

The term "acidic dyes" as used herein refers to water-soluble dyes which are capable of dying fibers such as wool, silk, Nylon, etc. in an acidic bath. These dyes have a wide variety of chemical structures, but can mainly be classified as azo dyes, anthraquinone dyes and metal complex salt azo dyes. Most acidic dyes contain a sulfone group.

It is not necessary that the above compounds be completely water soluble since practically the compounds, especially the dyes, are used at a level over the maximum solubility thereof in water.

The compound used must, of course, have a physical adsorbability, and as a general rule the degree of absorption is similar to that of the cellulose adsorptive dyes shown in the Dye Handbook (ibid) or to that of azoic color couplers.

While substituents other them the sulfo group can provide a useful effect (e.g., —COONa), most of the direct cotton dyes have at least one sulfo group, although exceptions exist such as C.I. Direct Yellow 1 and C.I. Direct Red 33. The inventors first conducted experiments using direct cotton dyes and then found that many of the basic dyes, naphthol dyes and acidic dyes were also effective, and such could be described as "water-soluble compounds having a physical adsorptive property to the hydrophilic cellulose and having at least one anionic substituent." Must of the dyes have one or more anionic substituents at the 1 to 6 positions of the aromatic ring moiety (benzene, naphthalene, anthracene, quinone) of the dye molecule.

In general, the direct cotton dyes contain one or more anionic substituents such as a sulfo group or a carboxyl group. In the present invention, any direct cotton dye can be used, but, particularly preferred examples include C.I. Direct Yellow 11, C.I. Direct Yellow 12, C.I. Direct Yellow 26, C.I. Direct Yellow 39, C.I. Direct Yellow 44, C.I. Direct Yellow 50, C.I. Direct Orange 6, C.I. Direct Orange 8, C.I. Direct Orange 10, C.I. Direct Orange 26, C.I. Direct Orange 39, C.I. Direct Orange 49, C.I. Direct Orange 51, C.I. Direct Red 1, C.I. Direct Red 2, C.I. Direct Red 4, C.I. DIrect Red 9, C.I. Direct Red 13, C.I. Direct Red 20, C.I. Direct Red 23, C.I. Direct Red 28, C.I. Direct Red 31, C.I. Direct Red 37, C.I. Direct Red 62, C.I. Direct Red 79, C.I. Direct Red 80, C.I. Direct Red 81, C.I. Direct Red 83, C.I. Direct Red 89, C.I. DIrect Red 224, C.I. Direct Red 225, C.I. Direct Red 226, C.I. Direct Red 229, C.I. Direct 230, C.I. Direct Violet 47, C.I. Direct Blue 1, C.I. Direct Blue 71, C.I. Direct Blue 78, C.I. Direct Blue 86, C.I. Direct Blue 98, C.I. Direct Blue 106, and the like.

In general, most of the basic dyes contain at least one cationic group, and specific examples of such materials include, for example, C.I. Basic Blue 9 (Methylene Blue), C.I. Basic Green 4 (Malachite Green), C.I. Basic Violet 3 (Crystal Violet), C.I. Basic Blue 26 (Victoria Blue), C.I. Basic Brown 1, C.I. Basic Red (Rhodamine 6 GCP (made by Sumitomo Chemical Co., Ltd.)), and the like. Since these dyes do not bear an anionic substituent, they do not meet the requirements of the present invention. However, those basic dyes which have an anionic substituent or substituents, for example, C.I. Basic Violet 10 (Rhodamine B) and the like, meet the requirements of the present invention and provide the same effects as the direct cotton dyes.

Naphthol dyes are naphtholic materials used as the coupling components for azoic colors, and can be said to be materials having 2-hydroxy-3-naphthanilide as a fundamental skeleton. Therefore, the naphthol dyes having further substituents and/or condensed rings on the naphthalene nucleus and/or benzene nucleus of the 2-hydroxy-3-naphthanilide are also included in the naphthol dyes in accordance with the invention. However, the naphthol dyes which do not have anionic substituents are not suitable for the present invention (the naphthol dyes referred to therein are coupling components for azoic colors and the dyes per se do not have a coloring property when they are absorbed onto hydrophilic cellulose.) Illustrative of such substituents are for example, an alkyl group having 1-3 carbon atoms (e.g., methyl, ethyl, propyl, etc.), an alkoxy group (e.g., methoxy, ethoxy, propxy, etc.), a nitro group, a halogen atom (e.g., chlorine atom, bromine atom, iodine atom, etc.) and like groups which render the dyes water-soluble. Examples of the group other than those set forth above are OH, $$-N\begin{matrix}R_1\\R_2\end{matrix}$$

wherein $R_1$ and $R_2$ may be the same or different and can be H, $CH_3$ or $C_2H_5$, and $$-CON\begin{matrix}R_1\\R_2\end{matrix}$$

wherein $R_1$ and $R_2$ are as defined above. Any water soluble naphthol dye having anionic groups can be used in the present invention. As the condensed rings, there are illustrated, for example, a benzene nucleus, which may be condensed to the naphthalene nucleus up to 2 in number and to the benzene nucleus up to 4 in number.

Specific examples of such naphthol dyes include, sodium 2-hydroxynaphthalene-3-carboylanilide-4'-sulfonate, sodium 2-hydroxy-2'-methoxy-3-naphthanilide-4'-sulfonate, sodium 2-hydroxy-3-naphthanilide-4'-carboxylate and the like.

The acidic dyes having an anionic substituent or substituents are, in general, inferior to direct cotton dyes in their physical adsorptive property to hydrophilic cellulose materials at ordinary temperatures. However, when the temperature of the aqueous solution of the dye is raised, the physical adsorptive property of the acidic dyes is increased to such an extent that they can be used in the present invention. Such acidic dyes would generally used at a temperature near the upper end of the from 2° to 90°C range. As illustrative examples of such acidic dyes there are C.I. Acid Yellow 19, C.I. Acid Yellow 99 and the like.

Though most of the acidic dyes having an anionic substituent or substituents are basically the same as those illustrated above, some of them exhibit the same effects as the direct cotton dyes even at an ordinary temperature. Such acidic dyes, though few in number, are effectively used in the present invention. Specific examples of such dyes include C.I. Acid Blue 158, C.I. Acid Red 186, C.I. Acid Red 265 and the like.

The above-described direct cotton dyes, basic dyes, naphthol dyes and acidic dyes can be used independently or as combinations of two or more thereof, though the acidic dyes are somewhat inferior to the direct cotton dyes in their effect and visibility.

The concentration of the aqueous solution of these dyes cannot be set within any overly critical numerical bounds because it varies depending upon the kind of dye used, the properties of the layer to be etched, such as the hardness, kind, thickness, etc., the temperature of the aqueous solution of the dye used, and the like. However, generally speaking, a concentration of more than 0.01 percent by weight is required, and the concentration is preferably about 0.5–5 percent by weight based on the entire treating solution weight though the dyes may be used in the supersaturated state at certain temperatures and with certain solution compositions, i.e., in an aqueous solution at a temperature of from 10° to 50°C.

The pH of the aqueous solution of the dyes may be acidic, neutral or alkaline, but an alkaline pH is most suitable, and particularly neutral to weakly alkaline pH's of (a pH of 7 to 11) are most preferred. If necessary, the pH is adjusted to be within this range. In order to adjust the pH of the solution, alkalis such as sodium hydroxide, potassium hydroxide, lithium hydroxide, sodium carbonate, etc. or acids such as acetic acid, sulfuric acid, hydrochloric acid, nitric acid, etc., can be used.

The temperature of the aqueous solution of the dye or dyes used ranges in general from 2° to 90°C, preferably from 10° to 50°C. Although the processing time cannot be within any overly critical numerical bounds, since it varies depending upon the properties of the layer to be etched, the composition of the aqueous solution of the dye, and the like, it is generally within the range of from 5 seconds to 5 minutes.

To the aqueous solution of the water-soluble organic compounds having a physical adsorptive property to the hydrophilic cellulose to be used in the invention and having at least one or more of anionic substituents there may further be added, secondary solvents. The secondary solvents which can be added to the aqueous solution of organic compounds are all water-miscible organic solvents. Suitable solvents as secondary solvents are alcohols such as methanol, ethanol, ethylene glycol, isopropyl alcohol and the like, ketones such as acetone, methyl ethyl ketone and the like, ethers such as ethylene glycol monomethyl ether, ethylene glycol diethyl ether and the like, and amides.

The secondary solvents can be used in an amount not greater than about 50 percent by volume of the solution. Any proportion in acceptable so long as the secondary solvent does not exceeds 50 percent by volume.

Processing with such a processing solution is conducted, in general, after processing with the etch-bleaching solution, and the water washing can be conducted therebetween.

The etch-bleaching of the present invention enables one to remove the hydrophilic surface area in the vicinity of a silver image by merely lightly wiping the surface with a sponge, an absorbent cotton, etc., and thus enables one to markedly improve the overall ease of the etch-bleaching process. Further, since the removal of the residue which is rendered friable by etching can be conducted with extreme ease, no friable residue remains and the hydrophilic surface at the non-image is not damaged. Therefore, when a sheet having thereon on oleophilic surface is used as the support, the etch-processed material can be used as a planographic printing plate which provides extremely distinct impressions.

Furthermore, when an aqueous solution of dyes other than the above-described naphthol dyes (colorless) is used as the aqueous solution of the water-soluble organic compound or compounds having a physical adsorptive property to the hydrophilic cellulose and having at least one or more of anionic substituents, various colored reversal images can be obtained depending upon the dye used. This is because the etching-removed area is not dyed with the aqueous solution of the dye while the non-image area, which is not etched, will adsorb the dye. Accordingly, when the etch-bleaching of the invention is applied to the platemaking step of preparing a printing plate as described above, it can be confirmed with the naked eye without inking the printing plate whether the etching step is complete or not, and whether the reproduction of the orginal is good or bad. Thus, the ease of using such a process is further improved.

In addition, the invention can provide a sheet to be subjected to overhead projector wherein the area dyed with the dye and the non-dyed area are so distinctly differentiated from each other that eye strain is reduced viewing such an overhead projection.

The invention will now be explained in greater detail by reference to several Examples which are not to be taken as limitative of the invention in any manner.

EXAMPLE 1

A cellulose triacetate sheet (155 microns thick) was immersed in the following processing solution D at 40°C for 60 seconds to hydrolyze the surface thereof (to render the surface hydrophilic) and at the same time introduce nickel sulfide therein. Thus, there was prepared an image-receiving material for use in a silver salt diffusion transfer.

| | | | |
|---|---|---|---|
| A | Glycerin | 100 | g |
| | Ammonium sulfide (aqueous solution containing 14.3% of sulfur) | 30 | ml |
| B | Glycerin | 180 | g |
| | Nickel chloride 6 hydrate | 0.3 | g |

The above solutions A and B were mixed at 30°C over a 5 minute period with stirring to prepare solution C. Solution C was then mixed with a separately prepared solution comprising 3000 g of methyl alcohol, 2000 g of water and 500 g of sodium hydroxide to prepare solution D.

To the image-receiving material there was applied a high speed orthochromatically sensitized silver chlorobromide emulsion (70 mol percent silver chloride) containing 1 mol of silver per 1 kg of the emulsion, which was gold- and dye-sensitized, in a dry thickness of 4 microns. After imagewise exposing the resulting emulsion layer, development was conducted in a diffusion transfer developer (20°C solution temperature) of the following prescription for 30 seconds:

| | |
|---|---|
| Cupric chloride | 5 g |
| Citric acid | 5 g |
| Ammonium peroxodisulfate | 130 g |
| Water to make | 1 liter |

After washing with 40°C water to remove the emulsion layer, there was obtained a positive image on the image-receiving material. This was processed with an etch-bleaching solution (25°C solution temperature) of the following formulation for 30 seconds:

| | |
|---|---|
| Cupric chloride | 5 g |
| Citric acid | 5 g |
| Ammonium peroxodisulfate | 130 g |
| Water to make | 1 liter |

At this stage, the friable residue which resulted in the exposed areas could not be removed unless considerable rubbing was conducted. However, upon immersing the element in a dye solution (25°C) of the following prescription for 30 seconds, the friable residue at the silver image became extremely easy to remove and, in addition, the degree of etching could be observed since a colored image resulted:

| | |
|---|---|
| C.I. Direct Yellow 50 | 20 g |
| Water to make | 1 liter. |

When the resulting material was used as a printing plate, there was obtained a good impression without damaging the hydrophilic layer at the non-image area.

EXAMPLE 2

The procedure described in Example 1 was followed except for conducting the immersion-processing at 15°C for 35 seconds using the a dye solution of the following formulation to thereby obtain a printing plate.

| | |
|---|---|
| C.I. Direct Orange 39 | 20 g |
| Water to make | 1 liter. |

Similarly to Example 1, the friable residue could be removed with ease and, in addition, the degree of etching could be observed since a colored image was obtained, which made platemaking easy.

When printing was effected using the resulting printing plate, there could be obtained a good impression.

EXAMPLE 3

The procedure described in Example 1 was followed except for conducting the immersion-processing at 40°C for 10 seconds using a dye solution of the following prescription to thereby obtain a printing plate:

| | |
|---|---|
| C.I. Direct Red 31 | 30 g |
| Water to make | 1 liter. |

The same effects as in Example 1 were obtained, and there was obtained a good impression using the resulting printing plate.

EXAMPLE 4

A cellulose diacetate sheet (155 microns thick) was immersed in the following solution D at 40°C for 45 seconds to hydrolyze the surface thereof (render the surface hydropholic) and at the same time introduce nickel sulfide thereinto. There was prepared an image-receiving material for diffusion transfer.

| | |
|---|---|
| Solution A | |
| Glycerin | 100 g |
| Ammonium sulfide (aqueous solution containing 14.3% of sulfur) | 40 ml |
| Solution B | |
| Glycerin | 180 g |
| Nickel nitrate 6 hydrate | 0.5 g. |

The above solutions A and B were mixed at 30°C over a 5 minute period with stirring to prepare solution C. Solution D was prepared by mixing 250 g of solution C with a solution comprising 3000 g of methyl alcohol, 2000 g of water and 500 g of sodium hydroxide. To the thus formed image-receiving sheet for diffusion transfer there was applied a gold-sensitized and orthochromatic dye-sensitized silver chlorobromide emulsion (75 mol percent silver chloride content) containing 1 mol of silver per 1 kg of the emulsion to give a dry thickness of 3 microns. After imagewise exposing through a positive original, development was conducted in the following developer at 20°C for 25 seconds:

| | |
|---|---|
| Anhydrous sodium sulfite | 100 g |
| Hydroquinone | 20 g |
| 1-Phenylpyrazolidone | 1.0 g |
| Sodium thiosulfate | 10 g |
| Potassium bromide | 2.5 g |
| Potassium hydroxide | 18 g |
| Water to make | 1 liter. |

The emulsion layer was then dissolved with 50°C warm water to obtain a positive image. This was processed with an etch-bleaching solution of the following prescription at 28°C for 25 seconds:

| | |
|---|---|
| Cupric sulfate 5 hydrate | 120 g |
| Citric acid | 170 g |
| Potassium bromide | 10 g |
| Ammonium peroxodisulfate | 120 g |
| Water to make | 2 liter |

At this stage, the friable residue which resulted in the exposed areas could not be removed unless considerable rubbing was conducted. However, upon immersing in the following solution at 30°C for 30 seconds, the friable residue located at the silver image areas became extremely easy to remove and, in addition, the degree of etching could be easily seen due to the visability of the image. When the resulting material was used as printing plate in an offset printing process, 5000 sheets of impressions having extremely distinct image areas could be obtained without damaging the hydrophilic layer at the non-image areas.

| | |
|---|---|
| C.I. Direct Blue 71 | 30 g |
| Water to make | 1 liter. |

EXAMPLE 5

| | |
|---|---|
| Solution A | |
| Glycerin | 50 ml |
| Methyl alcohol | 300 ml |
| Sodium sulfide 9 hydrate | 1.2 g |
| Sodium carbonate monohydrate | 0.2 g |
| Water | 10 ml |
| Solution B | |

-Continued

| | |
|---|---|
| Cadmium acetate dihydrate | 13.3 g |
| Water | 10 ml |

Solution B having the above composition was added to solution A over a 5 minute period with stirring to thereby prepare solution C wherein cadmium sulfide was dispersed. 100 Grams of solution C was mixed with the following solution D to prepare solution E.

| | |
|---|---|
| Solution D | |
| Water | 800 ml |
| Sodium hydroxide | 200 ml |
| Methyl alcohol | 1200 ml |

A cellulose acetate butyrate sheet 100 microns thick (trade nameL Type 161-40, manufactured by Eastman Kodak Co.) was immersed in the above-described solution E at 40°C for 40 seconds, then washed with water and dried. There was thus prepared a diffusion transfer image-receiving sheet whose surface was hydrophilic and contained a nuclei substance for diffusion transfer.

On the other hand, a negative light-sensitive material was prepared by applying a gold- and dye-sensitized silver chlorobromide emulsion (70 silver chloride content) containing 1 mol of silver per 1 kg of the emulsion to a polyethylene-laminated water-proof paper support in a dry thickness of 3.5 microns. The resulting negative light-sensitive material was exposed through an original positive image superposed thereon to form a latent image.

The negative light-sensitive material bearing the latent image and the above-described image-receiving sheet were placed in face to alignment under pressure for 50 seconds while spreading a developer having the following composition therebetween. Then, after peeling one sheet from the other, there was obtained an original positive image on the imagereceiving sheet:

| | |
|---|---|
| Anhydrous sodium sulfite | 70 g |
| Hydroquinone | 20 g |
| Potassium thiocyanate | 15 g |
| Potassium bromide | 1.5 g |
| Sodium hydroxide | 15 g |
| Water to make | 1 liter. |

The image-receiving layer was then processed with the same etch-bleaching solution as was used in Example 1 at 20°C for 30 seconds. At this stage, the friable residue in areas surrounding the silver images could not be removed unless considerable rubbing was conducted. However, upon immersing in a dye solution of the following prescription at 35°C for 20 seconds, the hydrophilic portion at the silver image area could be removed with ease:

| | |
|---|---|
| C.I. Direct Blue | 40 g |
| Sodium hydroxide | 200 mg |
| Water to make | 1 liter. |

3000 sheets of impressions could be printed using the resulting material as an offset printing plate. In addition, since the resulting image comprised light blue image areas and dark blue non-image areas, it could be used as a master for use in a negative type overhead projector.

EXAMPLE 6

The procedure described in Example 1 was followed except that the material was immersed in an etch-bleaching solution of the following prescription at 25°C for 30 seconds to thereby obtain a printing plate:

| | |
|---|---|
| Cupric chloride | 5 g |
| Citric acid | 5 g |
| Hydrogen peroxide aqueous solution (35% by weight) | 50 ml |
| Water to make | 1 liter. |

There were thus obtained the same effect as in Example 1 and, when the resulting plate was used as a printing plate, good impressions were obtained.

EXAMPLE 7

The procedure described in Example 1 was followed except that the material was processed in a dye solution of the following formulation at 30°C for 30 seconds to thereby obtain a printing plate:

| | |
|---|---|
| Sodium 2-hydroxynaphthalene-3-carboylanilide-4'-sulfonate | 30 g |
| Water to make | 1 liter. |

As in Example 1, the friable residue could be removed with ease and, when used as a printing plate, the material provided distinct impressions.

EXAMPLE 8

The procedure described in Example 7 was followed except that the material was immersed in an etch-bleaching solution of the following prescription at 25°C for 30 seconds to thereby obtain a printing plate:

| | |
|---|---|
| Cupric chloride | 5 g |
| Citric acid | 5 g |
| Hydrogen peroxide aqueous solution (5% by weight) | 50 ml |
| Water to make | 1 liter. |

The printing plate provided the same effects as in Example 7.

EXAMPLE 9

The procedure described in Example 1 was followed except that the material was immersion-processed at 25°C for 30 seconds using the dye solution of the following prescription:

| | |
|---|---|
| C.I. Basic Violet 10 | 30 g |
| Water to make | 1 liter. |

Similarly to Example 1, the friable residue could be removed with ease. In addition, since a colored image was obtained, the degree of the etching could be seen, which made platemaking easy. Distinct impressions could be obtained using the resulting plate.

EXAMPLE 10

The procedure described in Example 1 was followed except that the material was immersion-processed at 30°C for 30 seconds using a dye solution of the following prescription, to obtain a printing plate:

| | |
|---|---|
| C.I. Acid Red 186 | 30 g |
| Water to make | 1 liter. |

Similarly to Example 1, the friable residue could be removed with ease and, since a colored image was obtained, the degree of etching could be observed without inking, which made platemaking extremely easy. Distinct impressions could be obtained using the resulting printing plate.

EXAMPLE 11

A cellulose triacetate film having a thickness of 30(microns) was laminated onto a polyethylene terephthalate film having a thickness of 100 and silver was then vacuum deposited onto the cellulose triacetate film.

The surface of the resulting sheet was hydrolyzed to a depth of about 1.2 microns with the solution having the following composition to render the cellulose surface hydrophilic. There was thus prepared an image-receiving sheet for use in a diffusion transfer method containing colloidal silver as the silver precipitating nuclei in the diffusion transfer development:

| | |
|---|---|
| Lithium hydroxide | 35 g |
| Ethylene glycol | 100 g |
| Methyl alcohol | 550 g |
| Water | 400 g |

On the other hand, a silver chloride emulsion containing silver chlorde and gelatin in a proportion of 1:2 (by weight) was coated on a polyethylene-laminated water-proof paper in a dry thickness of 4 microns. The resulting material was exposed through a positive image and superposed on the above-described image-receiving sheet facing the hydrophilic film surface for 30 seconds while spreading a developer of the following composition there between. Upon stripping the elements, there was obtained a black positive image.

| | |
|---|---|
| Anhydrous sodium sulfite | 75 g |
| Hydroquinone | 18 g |
| Anhydrous sodium thiosulfate | 10 g |
| Potassium bromide | 2 g |
| Potassium hydroxide | 19 g |
| Water to make | 1 liter. |

The image-receiving sheet was then processed in the following etch-bleaching solution at 25°C for 30 seconds:

| | |
|---|---|
| Cupric bromide | 6 g |
| Phosphoric acid | 6 cc |
| Potassium peroxodisulfate | 140 g |
| Water to make | 1 liter. |

At this stage, the friable residue surrounding the image areas could not be removed unless considerable rubbing was conducted with absorbent cotton. However, after immersion in the following processing solution at 45°C for 14 seconds, the friable residue at the silver image areas became easy to remove.

| | |
|---|---|
| C.I. Direct Blue 71 | 30 g |
| Water to make | 1 liter. |

The hydrophilic portion at the image areas could be removed without damaging the hydrophilic portion at the non-image areas, whereby the cellulose triacetate layer was laid bear. There was thus obtained a good offset printing plate. 8000 impressions could be offset printed using the resulting printing plate.

While the invention has been described in detail and with reference to specific embodiments thereof, it will be apparent to one skilled in the art that various changes and modifications can be made therein without departing from the spirit and scope thereof.

What is claimed is:

1. An etch-bleach method for forming a printing plate which comprises forming a silver image in a hydrophilic cellulose layer by image-wise exposing a light-sensitive silver halide emulsion layer and developing said light-sensitive silver halide emulsion layer using a diffusion transfer developer with said exposed light-sensitive silver halide emulsion layer being in contact with a hydrolyzed hydrophilic cellulose layer containing diffusion transfer nuclei, removing the emulsion layer and obtaining said silver image and then processing the silver image with an etch-bleaching solution comprising an aqueous oxidizing agent solution wherein the improvement comprises processing the etch-bleached hydrophilic layer with an aqueous solution of a water-soluble organic compound having a physical adsorptive property to the hydrophilic cellulose and having at least one anionic substituent, said water-soluble organic compound being a direct cotton dye, basic dye, naphthol dye or acidic dye having one or more of the following substituents; a sulfo group, sulfino group, —$COO^-$ group, $CS_2^-$ group, carboxyl group, or a salt thereof, and then removing the hydrophilic portion remaining at the image areas without damaging the hydrophilic portion at the non-image areas.

2. The process of claim 1 where the oxidizing agent is a water soluble peroxide compound.

3. The process of claim 1 where from 0.3 to 30 percent by weight, based on solution weight of the oxidizing agent is used.

4. The process of claim 1 where the oxidizing agent further comprises a compound which reacts with silver to form a complex having low solubility in water.

5. The process of claim 1 where the dye is used in the form of an aqueous solution at 2° to 90°C.

6. The process of claim 5 where the dye is present in an aqueous system in a concentration of greater than 0.01 percent by weight, based on the total weight of the aqueous system plus the dye.

7. The process of claim 6 where the dye concentration is 0.5 to 5 percent by weight.

8. The process of claim 6 where the pH of the aqueous dye system is 7 to 11.

9. The process of claim 1 where the dye is a direct cotton dye.

* * * * *